United States Patent
Franczyk et al.

(10) Patent No.: US 11,334,643 B2
(45) Date of Patent: May 17, 2022

(54) CONTEXTUAL EDITING IN A PAGE RENDERING SYSTEM

(71) Applicant: WP Company LLC, Washington, DC (US)

(72) Inventors: Gregory Franczyk, Brooklyn, NY (US); Timothy Kim, Falls Church, VA (US); Lucas David Mason, Alexandria, VA (US)

(73) Assignee: WP Company, LLC, Washington, DC (US)

(*) Notice: Subject to any disclaimer, the term of this patent is extended or adjusted under 35 U.S.C. 154(b) by 1 day.

(21) Appl. No.: 15/221,270

(22) Filed: Jul. 27, 2016

(65) Prior Publication Data

US 2017/0031887 A1 Feb. 2, 2017

Related U.S. Application Data

(60) Provisional application No. 62/197,144, filed on Jul. 27, 2015.

(51) Int. Cl.
| | |
|---|---|
| *G06F 16/958* | (2019.01) |
| *G06F 40/106* | (2020.01) |
| *G06F 40/143* | (2020.01) |
| *G06F 40/166* | (2020.01) |

(52) U.S. Cl.
CPC .......... *G06F 16/958* (2019.01); *G06F 40/106* (2020.01); *G06F 40/143* (2020.01); *G06F 40/166* (2020.01)

(58) Field of Classification Search
CPC ............... G06F 17/211; G06F 17/3089; G06F 17/30861; G06F 17/30896; G06F 17/30893; G06F 17/243; G06F 17/21; G06F 17/2247; G06F 17/24; G06F 17/212; G06F 16/958; G06F 40/166; G06F 40/106; G06F 40/14; G06F 40/143
See application file for complete search history.

(56) References Cited

U.S. PATENT DOCUMENTS

| | | | |
|---|---|---|---|
| 7,000,184 B2 | 2/2006 | Matveyenko et al. | |
| 7,543,005 B1* | 6/2009 | Edelman | G06F 16/958 |
| 7,624,342 B2 | 11/2009 | Matveyenko et al. | |
| 8,387,006 B1* | 2/2013 | Taylor | G06F 17/3089 |
| | | | 717/110 |
| 8,464,148 B1 | 6/2013 | Wichary | |
| 8,522,134 B1* | 8/2013 | Zetlen | G06F 17/218 |
| | | | 715/235 |

(Continued)

OTHER PUBLICATIONS

Adobe Contribute CS3, Using and Administering Contribute, Copyright 2007.*
Adobe Contribute CS5, Using Adobe Contribute CS5.*

*Primary Examiner* — Cesar B Paula
*Assistant Examiner* — Carl E Barnes, Jr.
(74) *Attorney, Agent, or Firm* — Nixon & Vanderhye, P.C.

(57) ABSTRACT

Exemplary embodiments allow contextual editing to proceed in real time while the editor views the actual web page (or other page) being edited. The editing may change the underlying content without changing the look and feel of the web page. Example embodiments enable an editor or web page developer to make changes to already published content by changing cached or locally stored content without changing the original content stored in databases.

20 Claims, 10 Drawing Sheets

(56) References Cited

U.S. PATENT DOCUMENTS

| | | | |
|---|---|---|---|
| 9,864,735 B1* | 1/2018 | Lamprecht | G06F 17/2247 |
| 2002/0046245 A1 | 4/2002 | Hillar | |
| 2002/0091725 A1* | 7/2002 | Skok | G06F 16/958 |
| | | | 715/234 |
| 2002/0116418 A1 | 8/2002 | Lachhvani et al. | |
| 2002/0188636 A1 | 12/2002 | Peck et al. | |
| 2002/0194194 A1* | 12/2002 | Fenton | G06F 17/30817 |
| 2003/0204811 A1* | 10/2003 | Dam | G06F 16/958 |
| | | | 715/255 |
| 2004/0217985 A9* | 11/2004 | Ries | G06F 16/958 |
| | | | 715/740 |
| 2004/0243930 A1* | 12/2004 | Schowtka | G06F 17/248 |
| | | | 715/243 |
| 2004/0268231 A1* | 12/2004 | Tunning | G06F 40/143 |
| | | | 715/236 |
| 2006/0235984 A1* | 10/2006 | Kraus | G06F 17/24 |
| | | | 709/228 |
| 2009/0055755 A1* | 2/2009 | Hicks | G06F 17/3089 |
| | | | 715/760 |
| 2013/0019189 A1* | 1/2013 | Stewart | G06F 16/958 |
| | | | 715/760 |
| 2014/0281888 A1* | 9/2014 | Rego | G06F 40/106 |
| | | | 715/234 |
| 2014/0304682 A1* | 10/2014 | Taylor | G06F 9/45529 |
| | | | 717/113 |
| 2016/0189404 A1* | 6/2016 | Edge | G06T 11/60 |
| | | | 715/202 |
| 2017/0031869 A1* | 2/2017 | Franczyk | G06F 40/154 |

* cited by examiner

CONTEXTUAL EDITING IN A PAGE RENDERING SYSTEM

CROSS-REFERENCE TO RELATED APPLICATIONS

This application claims the benefit of U.S. Provisional Patent Application No. 62/197,144 filed on Jul. 27, 2015, which is hereby incorporated by reference in its entirety.

TECHNICAL FIELD

This disclosure generally relates to the editing of any page of content, such as a web page, and, more particularly to a method and system of enabling editorial staff to make quick fixes to already published content or other content.

BACKGROUND

There are a number of known page rendering engines useful for creating and compiling content from on-line and/or on premise sources to produce different web views across a plethora of different devices (i.e., computers, notebooks, tablets, cell phones, personal assistants, etc.). These page rendering engines enable users to relatively quickly create a web page including content. In particular, after the content is obtained and its arrangement on the web page is decided by a user, the page rendering engine may do all, or a substantial part, of the rendering without the user having to write programming code for that purpose. Page Builder™ by Site Origin™ is one such conventional page rendering engine. These conventional page rendering engines may be used by organizations, such as, for example, media services organizations, to distribute their product (e.g., content) via the web.

However, as more media services move to delivering their products via the web, and as the content needs to be updated, edited, corrected or otherwise improved, page rendering engines that are even more capable of efficiently leveraging available resources are desired.

In particular, streamlining the process of editing content has been a key goal of page rendering engines. For example, it has been proposed to open special editing windows which allow editorial changes to be made to at least a portion of the document. Another proposal utilizes the placement of object and editing function tags in the underlying markup of the document to be edited. Yet another proposal involves the editing of source code as opposed to using the graphical user interface (GUI) to effectuate changes in the content. Other proposals require a development process regarding the document to be edited which logically divides up a page into several editable features.

In all of these proposals, after the editorial changes have been completed and effectuated in the content and saved, the edited document must be downloaded to a client to allow viewing of the newly rendered and edited document by the editor.

SUMMARY

The exemplary embodiments described herein allow for contextual editing of a web page by clicking directly on the web page area, making the applicable updates, and saving the page. Accordingly quick fixes can be made, for example, to already published content cached in the memory of a page rendering system.

The exemplary embodiments allow contextual editing to proceed in real time while the editor views the actual web page being edited. The editing changes the underlying content, but not the metadata etc. that is used for rendering of the web page. Example embodiments enable an editor or web page developer to make changes to already published content by changing the cached or locally stored content without changing the original content stored in databases (e.g., original news content etc., as stored in backend databases) etc.

Exemplary embodiments of this editing process include: (1) configurable element editing wherein page features are defined and implemented with the features themselves; (2) rendering online news content or other content with no duplication of effort involved in making an editable interface and the interface that renders for the Web; and (3) dynamic layouts based on feature order and grouping that are not limited to a prescriptive, pre-defined selection of available layouts.

BRIEF DESCRIPTION OF THE DRAWINGS

FIG. 2 provides an example of text content eligible for editing by the editing module;

FIG. 3 illustrates the location of the text content in FIG. 2 which is eligible for editing;

FIG. 9 illustrates that an editor sees implemented content changes in real time as a site visitor would see the changes; and FIG. 10 illustrates sample code for contextual editing, according to some example embodiments.

DETAILED DESCRIPTION

Figure 1:
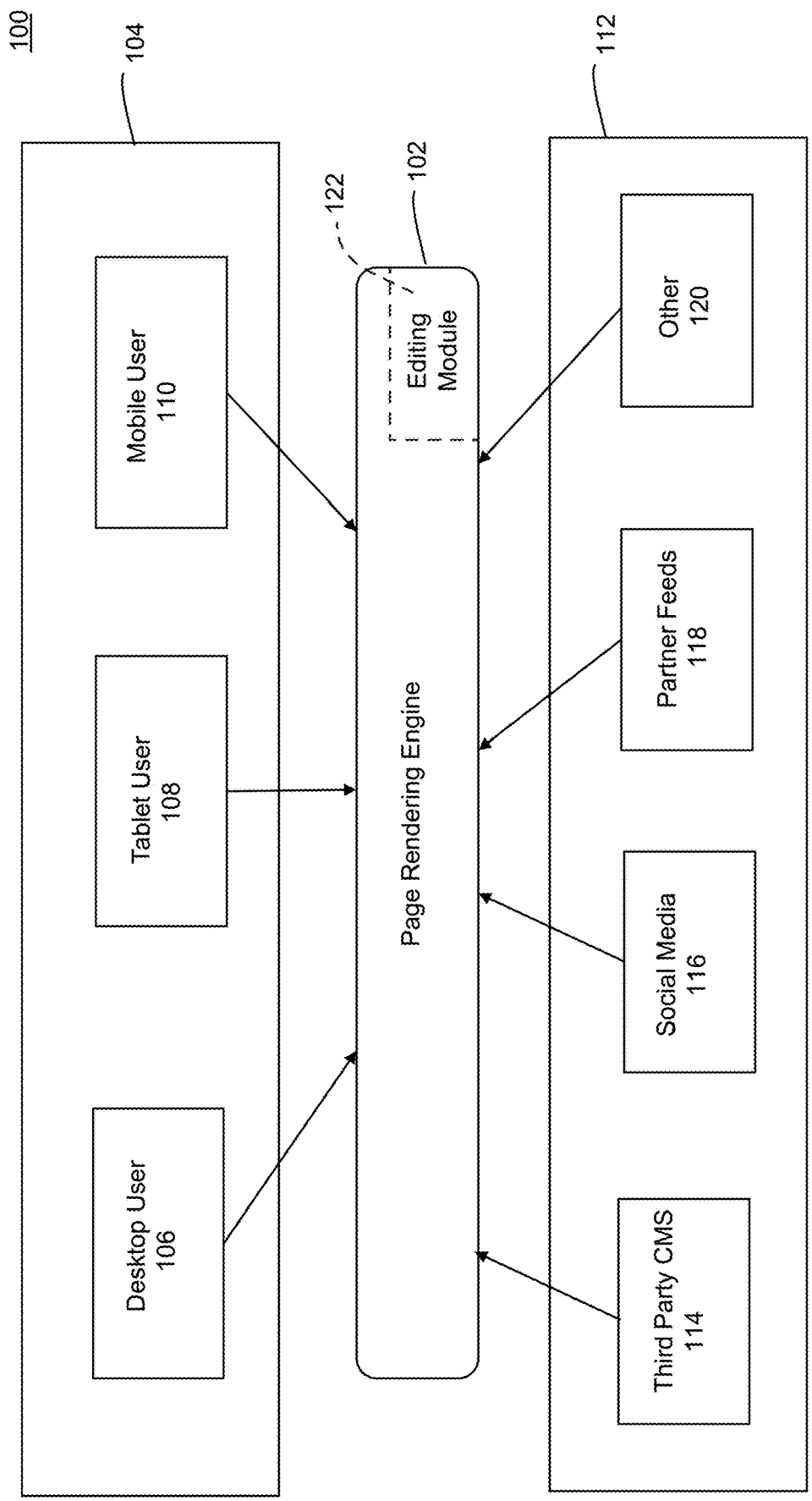
FIG. 1 is a high level schematic of a page rendering system including an editing module.

The basic architecture of the page rendering system 100 including editing module 122 according to one or more exemplary embodiments is schematically illustrated in FIG. 1. A page rendering engine 102 operates to render web pages on a plurality of types of web-accessing devices 104 being used by one or more end users. A desktop computer 106, a tablet 108, and a mobile device 110 are shown in FIG. 1 as example web-accessing devices used by end users. It will be understood, however, that page rendering engine 102 is not limited to rendering pages in a browser. For example, some embodiments can produce any text based rendering that's available through digital channels, including, e-mail's, RSS feeds, and other programmatic formats that can be used by downstream applications such as, for example, mobile and tablet native apps. The page rendering engine 102 operates to obtain information, including content subsequently rendered on the web-accessing devices 104, from various content providers 112. Content providers 112 may include web authoring platforms such as WordPress™ 114, social media platforms (e.g. Twitter™, Facebook™, Google+™ etc.) 116, partner feeds (e.g., news organization feeds, stock market feeds, etc.) 118, and other content providers 120 such as, for example, arbitrary databases (Washington Post™'s recipe database, election results etc.), quiz and poll platforms, digital asset management systems (such as, for example, video and photo content management systems). Thus, as illustrated in FIG. 1, the page rendering engine 102, takes as input, content from various content providers 112, and subsequently renders web-accessible pages, which include the content obtained as input, on various devices 104 for end users of the web site.

Web pages rendered by the page rendering system 100 are made up of "page features" which are modular components, like, for example, the navigation bar, header (e.g., page header, section header, etc.), a piece of content (e.g., an article body, an article header, an article, a video clip, etc.), or widget (e.g., a clickable icon for downloading an identified content, a social media share button, etc.). A web page includes page features arranged in a particular manner. These page features comprise the various page elements a site visitor reads and interacts with while on the page including text, images, media, and any interactive media. Each page feature contributes the Hypertext Markup Language (HTML) necessary for the feature to display itself on the page. Rendering a web page includes, determining an arrangement of plural features in a desired manner, and then writing the various page features according to the arrangement and with corresponding content to the device of a client. The rendering may proceed by first rendering each page feature individually, and then rendering the page containing all the page features. When the page rendering system 100 is deployed at a media services organization, page features are typically built by developers at the media services organization, and are added to web pages through the web administrative interface (web admin interface) by a web page editor or developer. When a page feature is added to a web page, it is referred to as an "instance of a page feature." An instance of a page feature includes the page feature, as built by the developer, and the configuration and/or content that has been associated with the page feature through the web admin interface. Concurrently filed application U.S. Ser. No. 15/221,291 filed on Jul. 27, 2016 and titled "Automated Dependency Management Based on Page Components", which is herein incorporated by reference in its entirety, describes techniques for associating page features with pages.

Each page feature can be logically connected to a piece of data in a content management system (CMS) database or in another source. When a developer defines a page feature, the developer can specify at least one type of content to use in the page feature. The system may be configured such that one or more base types are included for each page feature by default. For example, a page feature can specify that it is configured to handle one or more particular types of content (e.g., gallery, a link to social media etc.). The page rendering engine, in example embodiments, operates to automatically obtain the content for each page feature in accordance with the specification in the page feature. Concurrently filed application U.S. Ser. No. 15/221,283 filed on Jul. 27, 2016 and titled "Native Integration of Arbitrary Data Sources", which is herein incorporated by reference in its entirety, describes techniques for incorporating content from various sources.

Editing module 122 provides the capability to edit the content underlying any web page feature by clicking directly on a selected web page area, making the applicable updates and saving the page. For example, a web editor can click on a headline to invoke the editing functions of an editing module according to embodiments. The editing is enabled in-place on the displayed web page. The edits performed by the web editor to the headline may then be persisted in a storage accessible by the page rendering engine 102. Accordingly, quick fixes can be made to already published content cached (or otherwise locally stored content) in page rendering engine 102 via editing module 122.

As will be understood by those skilled in the art, editing module has been shown in FIG. 1 as incorporated into page rendering engine 102, however, the editing module 122 could be a separate external device with its own dedicated input/outputs, memory, processor and display linked to page rendering engine 102. In example embodiments, the editing module 122 includes a client portion (not separately shown) which is downloaded to the end user or client device having the browser or other user interface on which the editing by the user is performed, and a server portion which resides on the server affecting the editing. For example, when the editing involves a changing of color of an image (e.g., where, in addition to the image, the color of the image is also considered part of the content including the image), a client-side portion of the editing module 122 may be transmitted to execute on the client. The portion of the editing module code transmitted to the client may include, for example, a photo editor and/or color picker. Similarly, modules and/or code to be executed on the client (e.g. client browser) can be transmitted to the client device from the page rendering engine 102 in certain instances.

A web editor may invoke the editing module 122 by way of an edit interface. Upon being invoked, the editing module may display the requested web (or other) page on the display of the client device of the user. The web page displayed may be rendered using a page template for the requested web page, and a plurality of page features defined for that web page. The page features each are defined to be independent of each other, and may be arranged in a layout and/or order specified in the page template. The rendered page may be transmitted to the client device for display. In some embodiments, one or more of the page features are provided to the client device with the page template for rendering of the page on the client device.

Editing changes can be saved to the web page content. The system, however, can be configured to enable the page rendering system 100 to commit no edits to the original news content stored in the backend databases or other record systems. Accordingly, an archived record of the original unedited news content can be maintained together with copies of each edited version of the news content. In such example embodiments, the editing changes are made only to the cached web page content. The edited cached content can then be propagated from the cache to other end user devices accessing the web page, so that the edits can be reflected on the renderings on the other end user devices.

Figure 2:
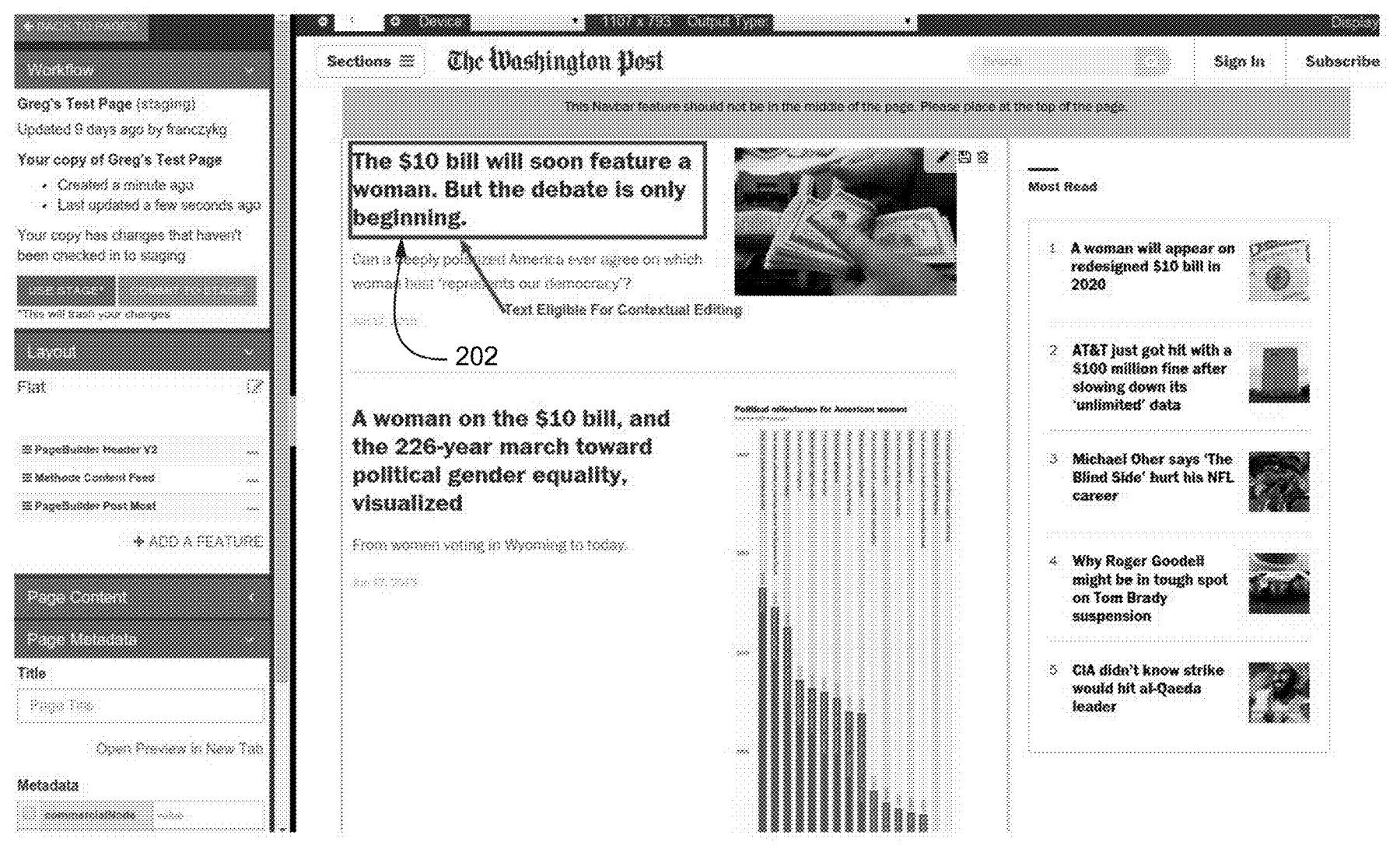
Figure 3:
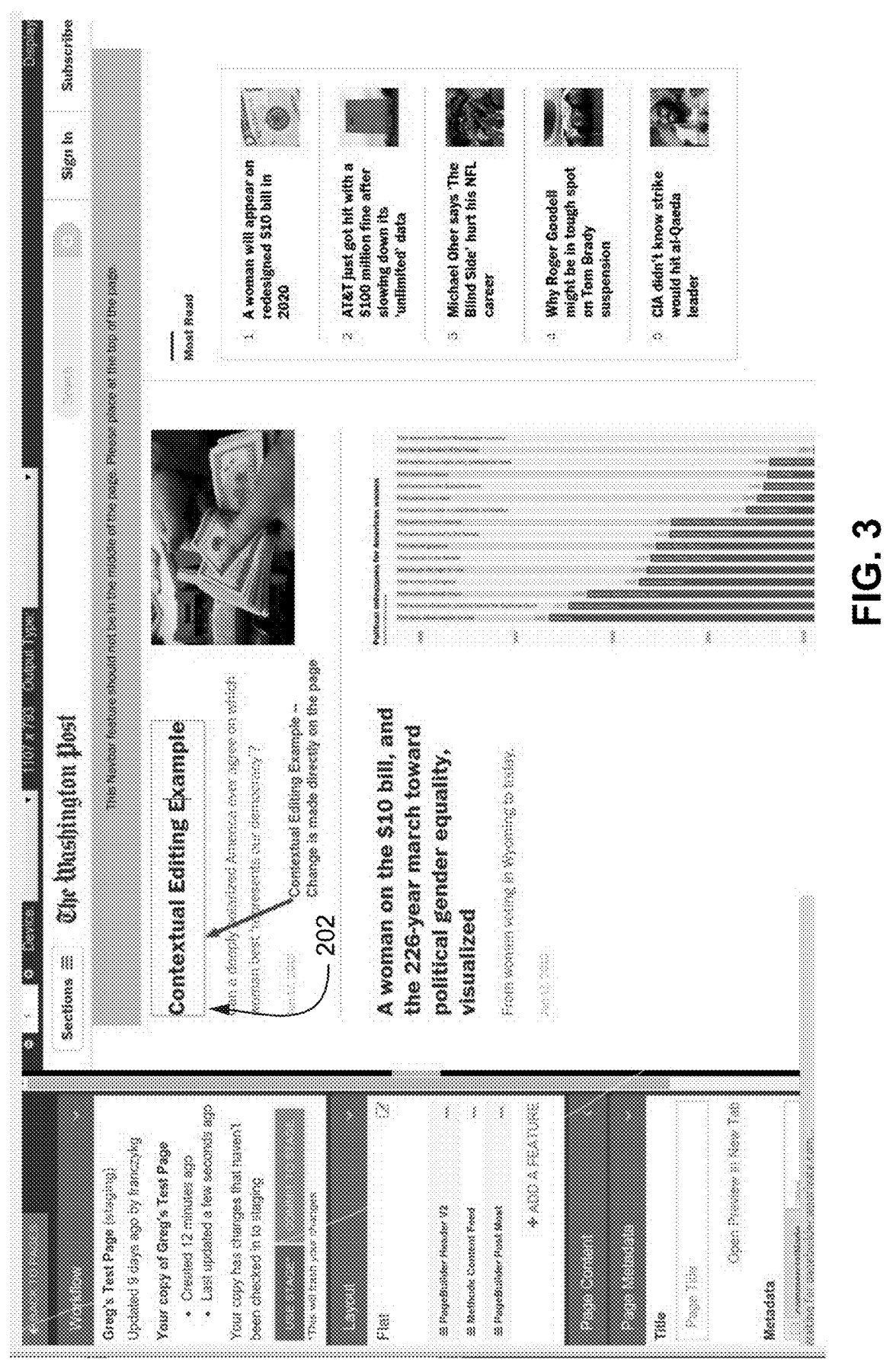

As shown in FIGS. 2-3, editing module 122 enables content producers and/or web page editors to edit the content while being able to view the content rendering in real time in substantially the same form and/or look and feel as an end user would see. This is achieved in example embodiments by changing the content, but without changing the presentation logic (e.g., HTML tags etc.) that provide a particular look and feel to the edited content.

In FIG. 2 the content within the dark lined enclosed box 202 (the box may not be part of the display) is eligible for editing (e.g., the web page developer having specified in the underlying HTML code that the content is editable) and/or has been selected (e.g., by the web page editor clicking on the content) for contextual editing. FIG. 3 shows the content within the dark lined enclosed box 202 to have been edited to "Contextual Editing Example." Contextual editing using the editing module in embodiments is What You See Is What You Get (WYSIWYG). That is, the web page editor can edit the content of a page while simultaneously, during the editing viewing the content as it would appear on an end user browser. As noted above, certain example embodiments, enable editing of the content without changing the rendering. More particularly, a web page editor or content producer can make updates to ever-changing online content, but any edits the web page editor makes occur only to the text (or other content), not to the web page's underlying presentation logic which gives the rendering a particular look and feel. For example, an editing change may cause the text content in the HTML (or other) code to change, but may not change certain HTML tags and other presentation logic.

Figure 4:
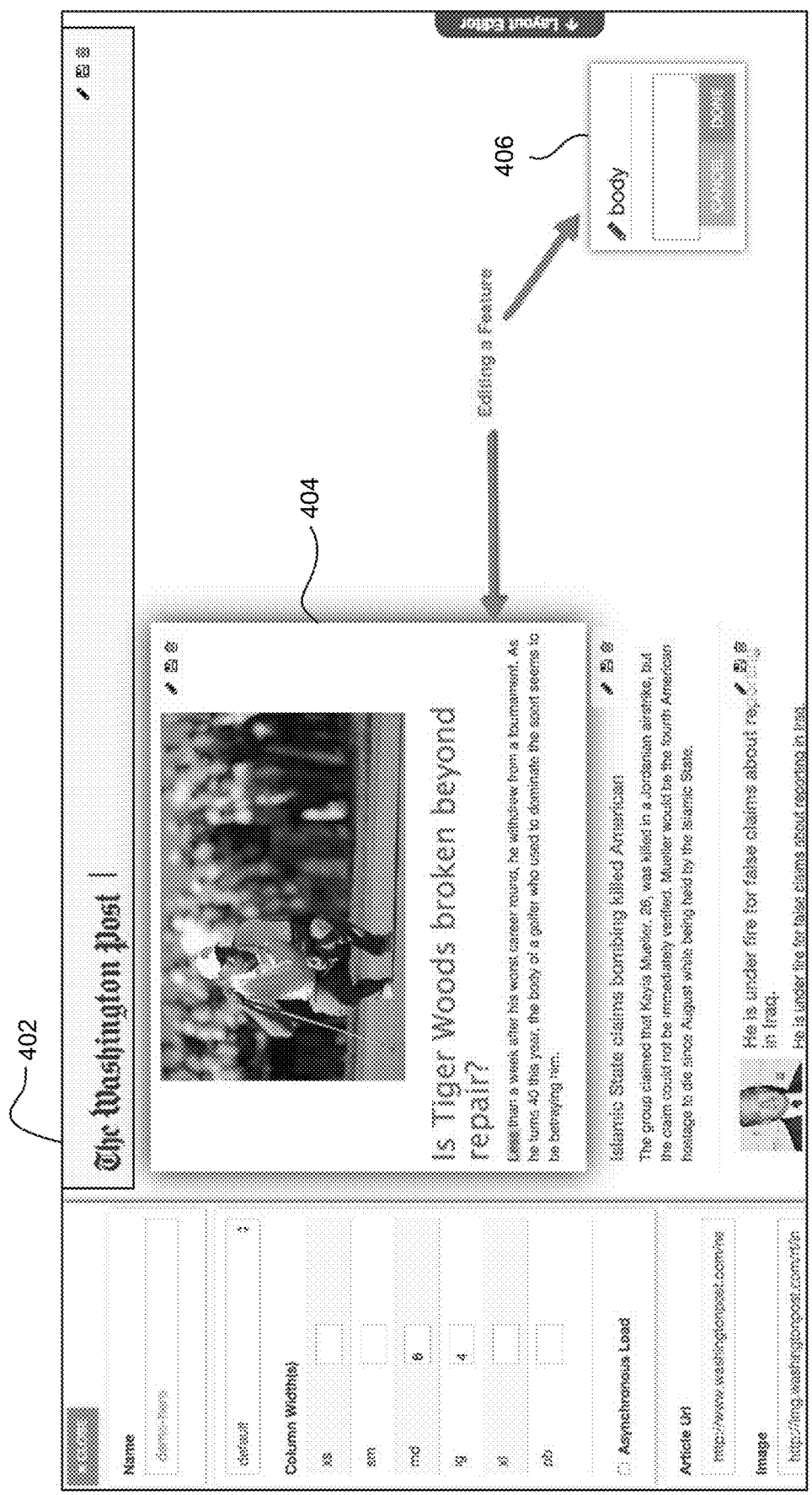
FIG. 4 provides an example of editable or configurable elements within a page feature.

FIG. 4 shows an example of a feature editing interface 402, according to some embodiments. The editing interface may be displayed on a browser, and may execute a portion of the editing module 122 on the client platform (e.g., client browser, client RSS reader, email client etc.) and another portion of the editing module on 122 on the page rendering engine 102 on a server. The editing interface, according to example embodiments, may be configured to display an indication for each editable page feature. For example, as shown in FIG. 4, the editing GUI displays a rendering of the web page as it would be seen by an end user, but with the addition of an indication of available editing options for each article page feature. The indication of available editing options, in the illustrated embodiment, is a pencil icon for invoking an editing option, a floppy disk icon for invoking a saving option for that (optionally edited) content, and a trash can icon to invoke a page feature delete option. A content producer or web page editor selects a page feature to be edited by clicking the pencil icon shown in the upper right hand corner of the highlighted page feature in FIG. 4, and then can edit any content elements within the feature which include, for example, images, headline text, and/or body text.

In some embodiments, the page may be initially displayed in edit mode without visually distinguishing editable features, with the indications of available editing options being displayed for a feature only when that feature is selected. Each editable page feature may be highlighted (e.g., expanded and/or shaded etc.), for example, as shown with content page feature 404, as the cursor comes within the area of that page feature on the display) and/or the web editor clicks on the page feature 404. Once a page feature, such as page feature 404, which has multiple editable aspects (e.g., the image, the headline and the content in page feature 404, which may each itself be a page feature) is selected, that part of the display screen can be clicked in order to invoke a popup window (e.g., such as content editing window 406) to enable convenient editing. For example, after page feature 404 is selected, the web editor may click on the text content (e.g., a "blurb") in the page feature to bring up an editor window 406 which enables more convenient editing and/or more editing features using which the text content can be edited in a WYSIWYG manner. For example, during the editing of a headline the edited parts of the headline will continue to be visible in a WYSIWYG manner before the editing is even completed and an indication as to the completion of the editing is provided by the user by an action like pressing/clicking a button.

Figure 5:
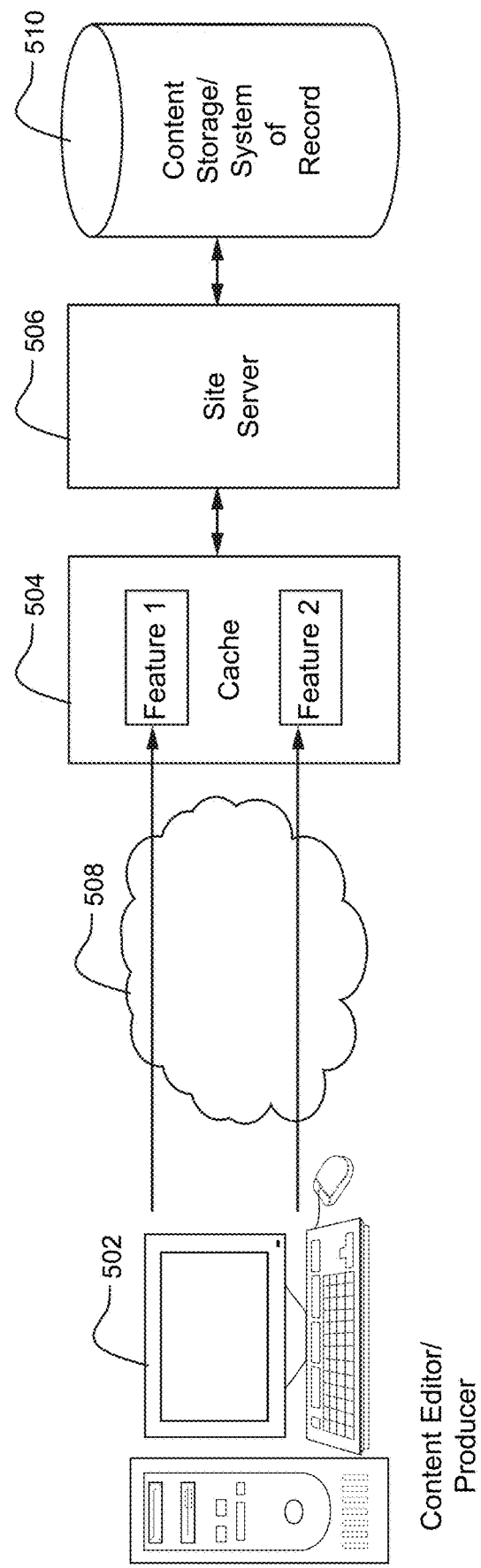
FIG. 5 illustrates editing of a feature which resides in cached content.

FIG. 5 schematically illustrates that the edits a content producer or web page editor operating on a client device 502 makes on a web page may be made only to the page feature content which resides in the cache, for example, in the cache memory 504 of the web site server computer 506. The content editor may access the site server 506 through a local or wide area network 508. The cached content in cache 504 may have been retrieved from a backend database or other content source 510 (e.g., external content sources). The site server 506 and original content source/content distribution source 510 may be connected by either a local or wide area network.

In some embodiments, when a web editor makes a change to the content of a page feature, that change (e.g., the changed content) is saved as metadata associated with that feature. When the page feature is rendered, the change metadata is applied to the original content.

Figure 6:
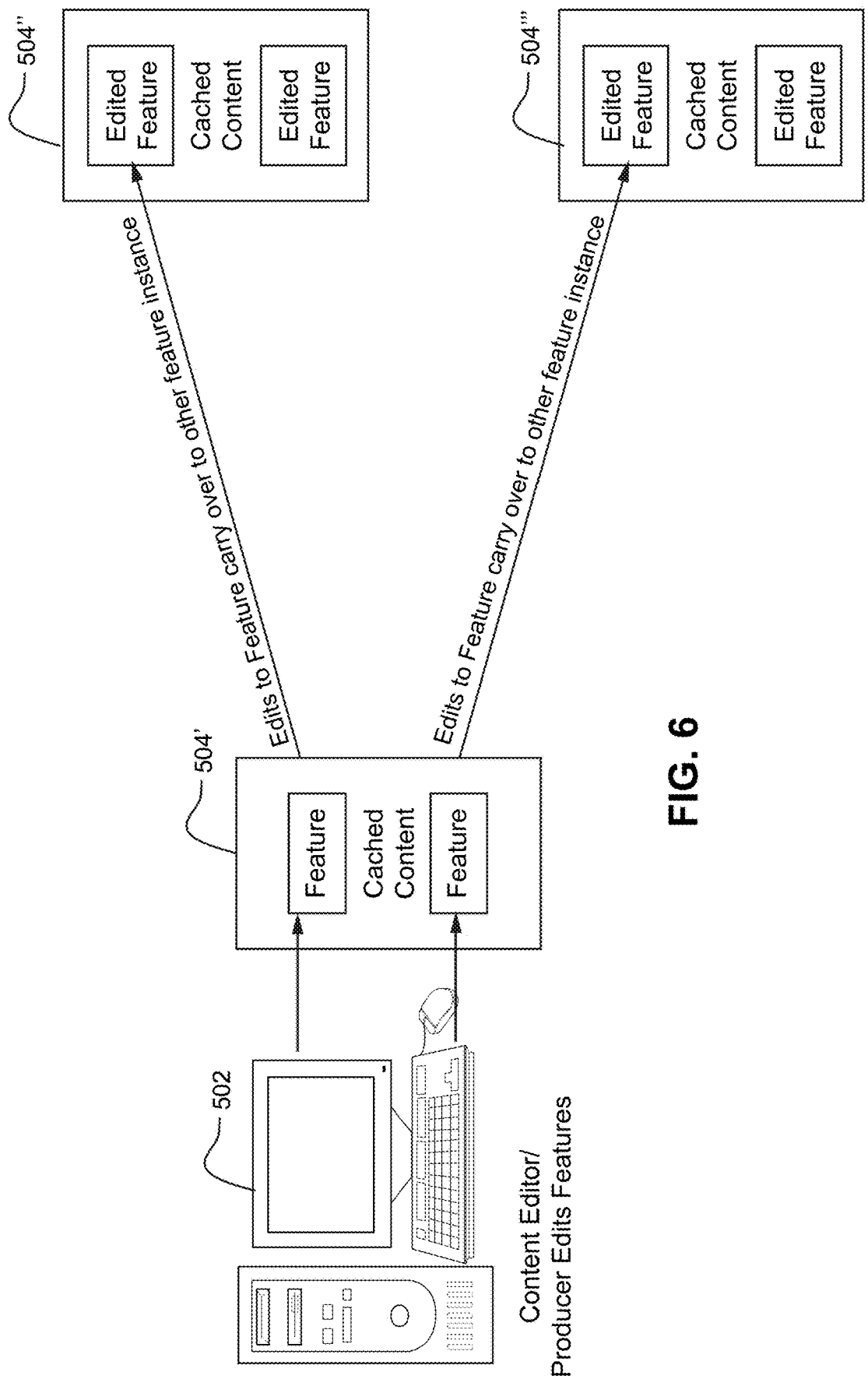
FIG. 6 illustrates editing of a feature carrying over to other locations the edited feature.

In some embodiments, a configuration option may specify at the system level or at some more granular level (e.g., user level, domain level, page level etc.) whether or not changes made to the content are to be persisted in a non-volatile storage memory (e.g., to the source of the content). By default, changes may not be persisted and/or may be persisted only in a local storage. In some embodiments, the changes may exist only in the cache memory such as cache 504. As schematically shown in FIG. 6, any edits made to elements in a page feature may also appear in other instances of that page feature. For example, a content producer makes an edit to a page feature that is part of a story, but that content and/or page feature appears in two separate sections of a media web site. When the content editor makes the edit once, the changes may appear in both occurrences of that content and/or page feature in the cache.

For example, a particular headline may appear in a page feature that also includes the corresponding content, and may also appear in a page feature which displays a list of the headlines on that web page. This may be facilitated, in example embodiments, by a table or other data structure in memory that keeps track of each page feature in a web page, and associations between the different page features. In example embodiments, a first page feature instance may be linked to another instance of that same type of page feature or other page feature so that when one of those other page features are updated, the first page feature may also be updated. For example, upon completing an update to content of one of the other page features, a process may be triggered to update any linked page features such as the first page feature noted above. A table or other data structure such as above may be traversed to find all occurrences of a particular page feature in a particular web page, or page features that are linked to a particular page feature.

Moreover, by triggering the server to update any clients that are currently displaying a page feature upon detecting that the page feature has been updated, the current rendering of that page feature to any end users accessing the web page will be updated so that the end users see the edited content and/or page feature. FIG. 6 illustrates that changes made to page features 504' are, at least in some configurations, also applied to other instances 504" and 504" or that same page feature, in the cached content. In some embodiments, there may be configuration settings for the web editor to selectively enable/disable whether the changes made to a page feature are applied only to that page feature or to all instances of that page feature.

In some embodiments, there are also options for saving the edits and/or for deleting a page feature. For example, the floppy disk icon shown in the top right hand of several features in FIG. 4, invokes a save process when selected. The trash can icon shown for several page features in FIG. 4 invokes a delete process.

With respect to the delete option, the content editor can delete the page feature and/or particular content from a web page, but if the feature resides in multiple places on a media cite, the other instances of the feature may remain. That is the system may be configured so that only the particular instance of the page feature deleted will be removed from the web page, while leaving any other instances of that page feature intact in the web page. Once a feature has been deleted from a page, the content editor can substitute a new feature or rearrange the layout of the page to do without the deleted feature. In some example embodiments, the system may be configured so that deleting one instance of a page feature may results in the removal of all instances of that page feature from the web page.

The above described process can be used by a content producer/web editor who, after publishing content on the page rendering system, determines that the headline is too long to fit properly into the page design. Accordingly, the content producer/web editor can log into page rendering system 100, revise the headline to something shorter and more suited to the page design while viewing, in real-time, how it looks from a single user interface as would be seen by an end user. In contrast, a content producer using conventional page rendering and editing systems would have had to make the same changes in a content headline without knowing how the new headline appears in the design and, therefore, would need to take the extra steps to republish and preview the design change.

Thus, in the exemplary embodiments described herein, editable or configurable elements are defined and implemented within page features so that the editing client implements a class of available editing operations for a feature developer to use. The page rendering system 100 including editing module 122 auto updates, extracts data and overwrites the appropriate matching content when the content producer finishes an edit. If an HTML element or elements are marked to be associated with a content element, then a software module such as an admin software development kit (SDK) may be configured to convert the content into an editable format.

Page rendering system 100 may have several differentiators over conventional systems in how it handles contextual editing of web content: editable or configurable elements within a page are defined and implemented as page features; rendered web page layouts are dynamic and based on page feature order and grouping; and the layouts are not limited to a prescriptive, pre-defined selection of available layouts. The editing module implements a class defining the available editing operations that feature developers can use. Unlike conventional systems, there is no duplication of effort involved in making an editable interface and the interface that is rendered for the Web (i.e., a single interface is provided for editing the web page and for use in rendering on client devices). Also in contrast to conventional systems that require web editors to edit at the page level, example embodiments, by implementing page features that stand by themselves, provide for more extensive and efficient editing capabilities. For example, web editors can group page features and/or modify the layout of individual page features within a page.

Figure 7:
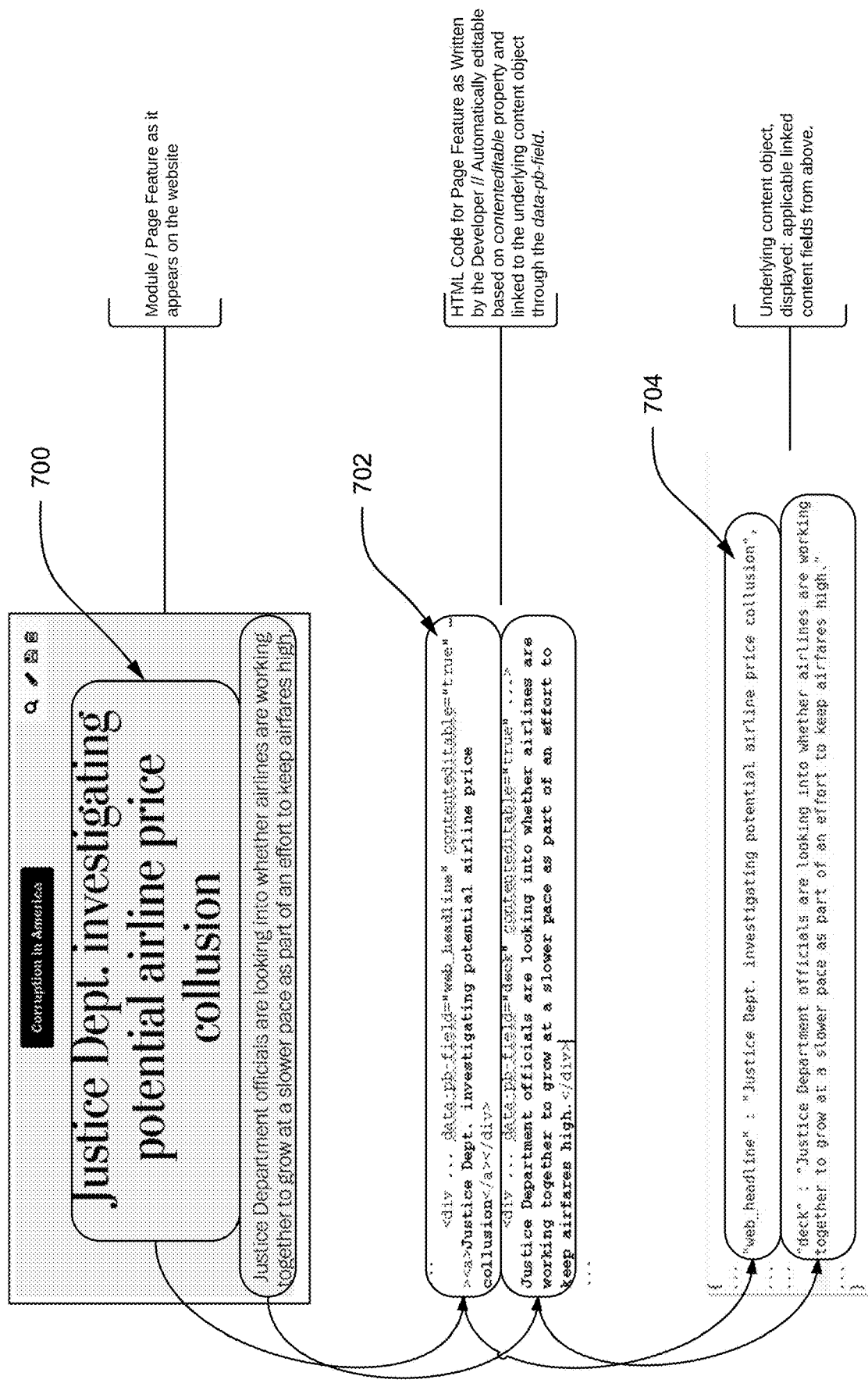
FIG. 7 illustrates linkages between an editing module the underlying HTML Code and between the HTML Code and the underlying content object.

FIG. 7 schematically illustrates some of the connections and interactions that are effected by the page rendering system 100 in contextual editing, according to some example embodiments. As shown in FIG. 7, a module/page feature 700 (e.g., a headline of an article) as it would be rendered on a website is linked to underlying HTML code 702 which is in turn linked to the underlying content object 704, as shown in FIG. 7, then the editor can make changes directly, and in place, on the content displayed in the module/page feature 700. The example HTML code 702 for page feature 700 may have been written by a web page developer, or in some embodiments automatically generated from a web interface design system. The code 702 illustrates an attribute named "data-pb-field" that specifies the underlying content for that page feature. The code 702 also shows an attribute named "contenteditable" which specifies that the page feature is editable. In accordance with the code 702, the corresponding object 704 is configured to be editable. When the displayed content 700 is edited, objects 704 may be changed, and/or additional metadata may be associated with objects 704 enabling the subsequent rendering of the content and any associated metadata in order to represent the content as edited.

Figure 8:
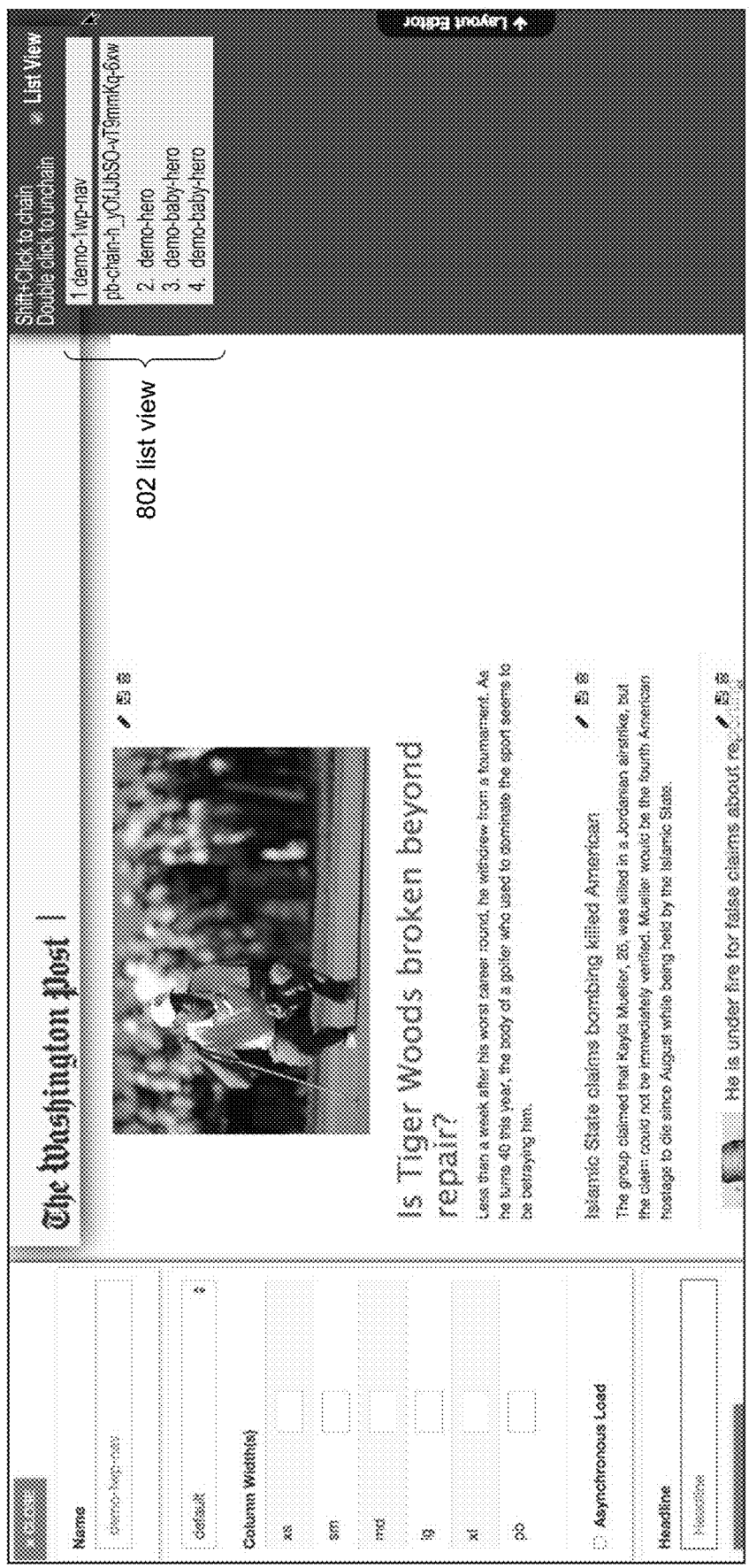
FIG. 8 illustrates dynamic editing of page layouts.

As noted above, web page layouts are dynamic and based on feature order and grouping, and the layouts are not limited to a prescriptive, pre-defined selection of available layouts. As illustrated in FIG. 8, content producers and/or web page editors can control page layout dynamically from the left sidebar. In the page list view 802 shown on the left side bar of the screen illustrated in FIG. 8, the listing represents that the page contains two page features and that the second page feature includes three separate page features. Basically, the list view 802 provides a bird's eye view of the page by specifying that there is a headline and a group of three page features.

For example, content producers can dynamically control page layout since they are completely customizable and configurable with the option to change the page layout using drag and drop and the use of Cascading Style Sheets (CSS) and JavaScript to complete the design. Any pages created by the page rendering system 100 are a list of features and the data structure that describe the pages does not limit its rendering or format—it is a flat list. There is a separation between data representation and the dynamic page layout that the page rendering system delivers. A site can include one or more layouts and be preconfigured to use a particular layout. A designer or other website team member can toggle the layout at the page level if the need arises to change the design.

Figure 9:
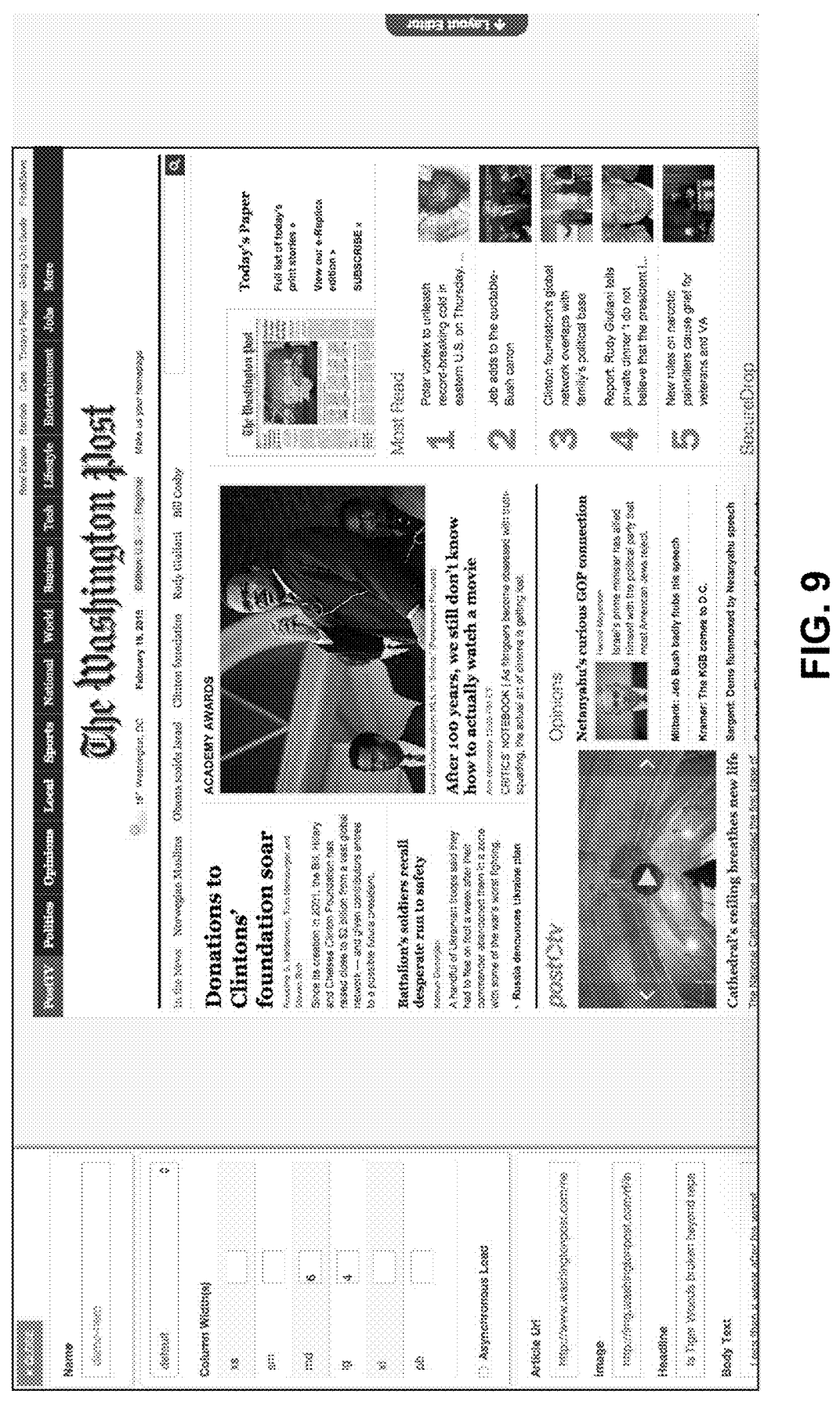

The page rendering system 100 renders online media content with no duplication of effort within an editable interface. Content producers/web editors can see the result of any updates, edits and revisions, just as a site visitor would view them. A content producer/web editor can see the updates without the need to open a new browser session. FIG. 9 shows online news content rendering directly from the page rendering system 100 interface.

For example, if an online media site desires to support desktop users and their growing community of mobile site visitors, the page rendering system 100 can render page features for both desktop browser and mobile users using the same configurable elements (e.g. page features) and layouts. This feature rendering method also conserves developer time because they only have to develop page elements once. As noted, there is no duplication of effort involved in making an editable interface and the interface that is rendered for the Web.

Figure 10:
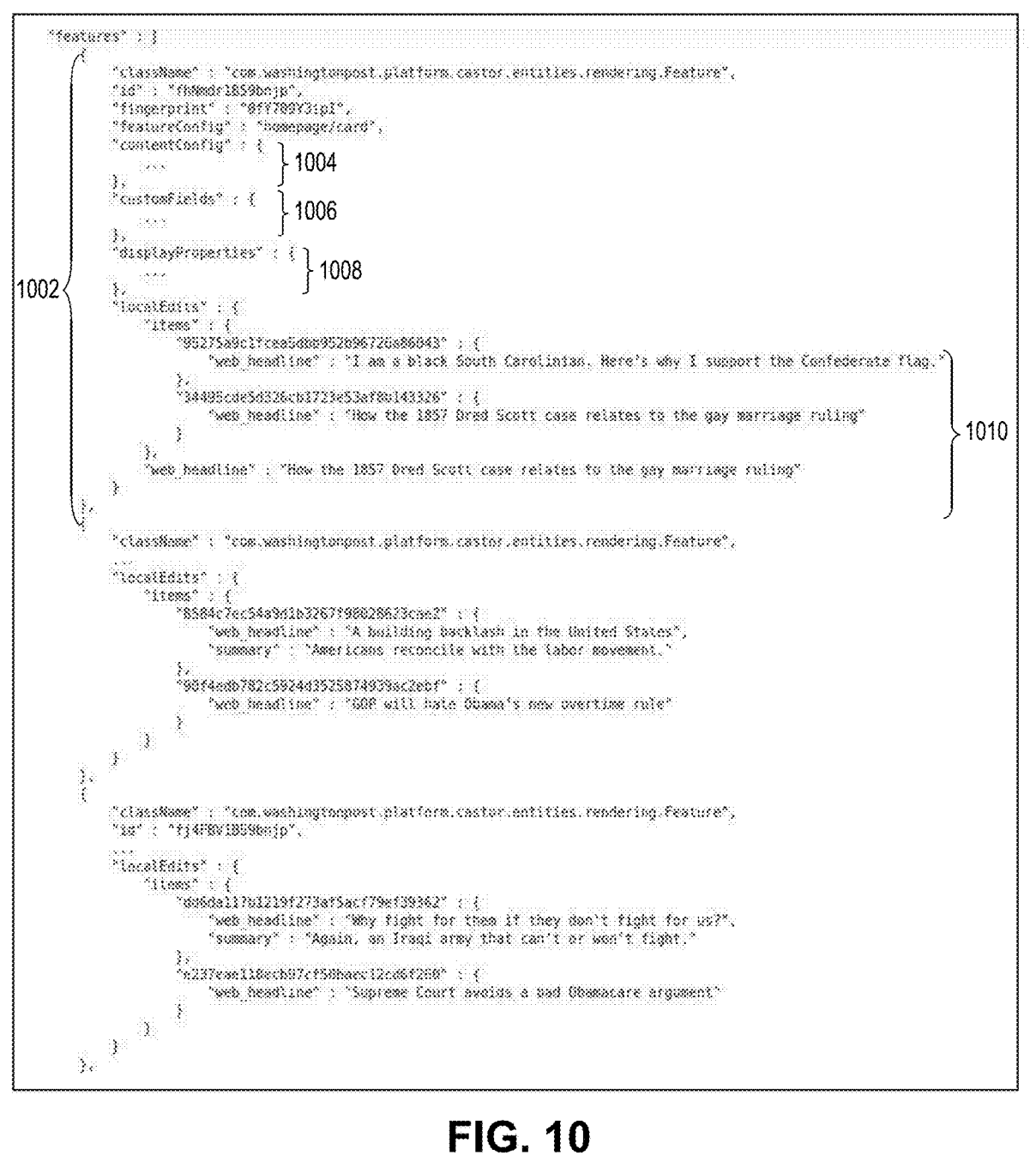

FIG. 10 illustrates portions of code used in some example embodiments. Code snippets of three page features are illustrated. The first feature (e.g. the "homepage/card") 1002 has content configuration 1004 specifying where the content is and how the content is to be retrieved, custom fields 1006 specifying what customizations are to be applied, and display properties 1008 specifying what display properties are to be applied. Item 1010 represents the local edits that are to be applied to the content rendering.

When this page feature is being rendered, the rendering process according to example embodiments will first obtain the content using the content configuration 1004, apply any customizations specified in 1006, apply any display properties specified in 1008, and obtain the homepage/card page templates and render the page feature. Before the rendering the edits 1010 are also applied to the templates. The other page features (the names of the features and some of the other aspects of those features are not shown in FIG. 10) can also be rendered in a similar manner.

It will be appreciated that although many of the embodiments are described in the context of media or news services, embodiments are not restricted thereto and may apply to any content that is rendered using a web platform or the like. It will also be appreciated that as used herein, the terms system, subsystem, service, logic circuitry, and the like may be implemented as any suitable combination of software, hardware, firmware, and/or the like. It also will be appreciated that the storage device locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein, for example, in relation to the page rendering engine 102, may be accomplished by having a computer processor execute instructions that may be tangibly stored on a computer readable storage medium. The computer running the page rendering engine 102 may communicate over one or more network interfaces with client and/or end user devices 104, and also may communicate over one or more network interfaces with external sources 112. Processes for performing the described contextual editing may be implemented on the processor of the page rendering engine 102, based upon stored program instructions. Configuration and/or web page editing screens such as that shown in the figures may be displayed on any client/end user display device.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A page rendering system comprising a server including:
a memory;
a network interface; and
a processor configured to:
receiving, via the network interface, a request for editing a page from a client device;
retrieving, from the memory, a plurality of page features associated with the requested page;
generating an editable page corresponding to the requested page, the editable page comprising the retrieved plurality of page features;
rendering the editable web page to the client device in a manner as it would appear on an end user browser;
providing for a user to edit a certain content in a particular portion in a page feature from the plurality of page features of the editable page; and
in response to a received user input specifying an edit of the particular portion in the page feature:
(1) re-rendering the editable page to the client device while representing the specified edit in the re-rendered editable web page in a WYSIWYG manner as appearing in the end user browser, wherein the re-rendering is repeated during the editing with each re-rendering including an additional newly edited portion as the certain content is being modified by the user without requiring the user to provide an indication that the specified edit has been completed;
(2) automatically updating a plurality of instances of the certain content in one or more caches concurrently with the re-rendering during the editing, the updated plurality of instances each (a) including a respective copy of the edited particular portion in the page feature and (b) being redisplayed in respective web pages after the automatically updating; and
(3) when a configurable parameter is in a first setting, changing an archived copy of the certain content in accordance with the edit, and when the configurable parameter is in a second setting, performing said automatically updating without changing the archived copy of the certain content in accordance with the edit.

2. The page rendering system of claim 1, further comprising a client device having a display screen and a second processor configured to:
display the editable page on the display screen;
receiving user input from the user; and
when the received user input specifies an edit of the particular portion, re-displaying the editable page on the display screen while reflecting the specified edit in the redisplayed editable page.

3. The page rendering system of claim 2, wherein the page is a web page, and wherein the web page is displayed in a web browser executing on the client device.

4. The page rendering system of claim 1, wherein the first processor is further configured to, in response to said received user input specifying an edit of the particular portion, store the certain content subjected to the specified edit in a local cache memory storage of the server.

5. The page rendering system of claim 4, wherein the first processor is further configured to determine whether to write the specified edit to a source of said content based on the configuration parameter.

6. The page rendering system of claim 4, wherein the first processor is further configured to, upon said storing the certain content subjected to the specified edit in one instance of the certain content in the local cache memory storage, automatically update one or more other instances of the certain content in the local cache memory storage, the one instance and the other instances including copies of the updated certain content.

7. The page rendering system of claim 6, wherein the automatically updating one or more other instances of the certain content in the local cache memory storage comprises automatically updating a first cached instance of the certain content and a second cached instance of the certain content, the first and second cached instances including copies of the updated certain content and corresponding to respective items currently displayed on a same web page.

8. The page rendering system of claim 6, wherein the automatically updating one or more other instances of the certain content in the local cache memory storage comprises automatically updating a first cached instance of the certain content and a second cached instance of the certain content, the first and second cached instances including copies of the updated certain content and corresponding to respective items currently displayed on respective web pages.

9. The page rendering system of claim 1, wherein the first processor is further configured to perform the specified edit of the certain content without changing presentation logic associated with said rendering of the web page.

10. The page rendering system of claim 1, wherein the first processor is further configured to, in response to an indication that the specified edit has been completed, automatically update copies of the certain content in pages displayed on one or more other client devices.

11. The page rendering system of claim 10, wherein the first processor is further configured to perform the automatically update using the specified edit saved as metadata stored in a cache memory in association with the certain content.

12. The page rendering system of claim 11, wherein the automatically updating includes, in response to the certain content in a first page feature being updated, updating the first page feature in pages displayed on one or more other client devices and updating a second page feature, different from the first page feature but including the certain content, in at least one page displayed on one or more other client devices.

13. The page rendering system of claim 12, further including a table in the memory associating the certain content with the first page feature and the second page feature, wherein the automatically updating includes referring to the table to determine that the certain content is also associated with the second page content.

14. The page rendering system of claim 1, wherein the first processor is further configured to automatically update one or more other copies of the certain content associated with the editable page.

15. The page rendering system of claim 1, wherein the first processor is further configured to, in response to the request from the client device, transmit one of a page feature and code for editing said certain content to the client device.

16. A page rendering method comprising:
    receiving a request for editing a page from a client device;
    retrieving a plurality of page features associated with the requested page;
    generating an editable page corresponding to the requested page, the editable page comprising the retrieved plurality of page features;
    rendering the editable web page to the client device in a manner as it would appear on an end user browser;
    providing for a user to edit a certain content of a particular portion in a page feature from the plurality of page features of the editable page; and
    in response to a received user input specifying an edit of the particular portion in the page feature:
    (1) re-rendering the editable page to the client device while representing the specified edit in the re-rendered editable web page in a WYSIWYG manner as appearing in the end user browser, wherein the re-rendering is repeated during the editing with each re-rendering including an additional newly edited portion as the certain content is being modified by the user without requiring the user to provide an indication that the specified edit has been completed;
    (2) automatically updating a plurality of instances of the certain content in one or more caches concurrently with the re-rendering during the editing, the updated plurality of instances each (a) including a respective copy of the edited particular portion in the page feature and (b) being redisplayed in respective web pages after the automatically updating; and
    (3) when a configurable parameter is in a first setting, changing an archived copy of the certain content in accordance with the edit, and when the configurable parameter is in a second setting, performing said automatically updating without changing the archived copy of the certain content in accordance with the edit.

17. The page rendering method according to claim 16, wherein the page is a web page.

18. The page rendering method according to claim 17, further comprising automatically updating one or more other copies of the content and/or the page feature associated with the editable page.

19. The page rendering method according to claim 16, further comprising performing the automatically updating using metadata stored in a cache memory, the metadata representing the specified edit.

20. A non-transitory computer readable storage medium having instructions stored therein that when executed by a processor of a computer, cause the computer to perform operations comprising:
    receiving a request for editing a page from a client device;
    retrieving a plurality of page features associated with the requested page;
    generating an editable page corresponding to the requested page, the editable page comprising the retrieved plurality of page features;
    rendering the editable web page to the client device in a manner as it would appear on an end user browser;
    providing for a user to edit certain content of a particular portion in a page feature from the plurality of page features of the editable page; and
    in response to a received user input specifying an edit of the particular portion in the page feature:
    (1) re-rendering the editable page to the client device while representing the specified edit in the re-rendered editable web page in a WYSIWYG manner as appearing in the end user browser, wherein the re-rendering is repeated during the editing with each re-rendering including an additional newly edited portion as the certain content is being modified by the user without requiring the user to provide an indication that the specified edit has been completed;
    (2) automatically updating a plurality of instances of the certain content in one or more caches concurrently with the re-rendering during the editing, the updated plurality of instances each (a) including a respective copy of the edited particular portion in the page feature and (b) being redisplayed in respective web pages after the automatically updating; and
    (3) when a configurable parameter is in a first setting, changing an archived copy of the certain content in accordance with the edit, and when the configurable parameter is in a second setting, performing said automatically updating without changing the archived copy of the certain content in accordance with the edit.

* * * * *